US011519997B1

(12) United States Patent
Sandusky (10) Patent No.: US 11,519,997 B1
(45) Date of Patent: Dec. 6, 2022

(54) BROAD-AREA LASER AWARENESS SENSOR (71) Applicant: National Technology & Engineering Solutions of Sandia, LLC, Albuquerque, NM (US)

(72) Inventor: John Sandusky, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 89 days.

(21) Appl. No.: 17/337,837

(22) Filed: Jun. 3, 2021

(51) Int. Cl.
*G01S 3/782* (2006.01)
*G06T 7/00* (2017.01)
*H04N 7/18* (2006.01)
*B64D 47/08* (2006.01)
*G06T 7/60* (2017.01)
*G06T 7/73* (2017.01)

(52) U.S. Cl.
CPC ............ *G01S 3/782* (2013.01); *B64D 47/08* (2013.01); *G06T 7/60* (2013.01); *G06T 7/73* (2017.01); *G06T 7/97* (2017.01); *H04N 7/188* (2013.01); *G06T 2207/10016* (2013.01)

(58) Field of Classification Search
CPC .. G06T 7/97; G06T 2207/10016; H04N 7/188
See application file for complete search history.

(56) References Cited

U.S. PATENT DOCUMENTS

| 2011/0169945 A1* | 7/2011 | Petrini | G08G 5/045 348/135 |
| 2013/0063593 A1* | 3/2013 | Tasaki | H04N 7/183 348/143 |
| 2019/0384232 A1* | 12/2019 | Casey | G06T 7/0002 |

(Continued)

OTHER PUBLICATIONS

"ApacheCarriesOne", https://customer.janes.com/Janes/Display/jfs_5871-jfs, Apr. 10, 2020, 2 Pages.
(Continued)

*Primary Examiner* — Jayanti K Patel
*Assistant Examiner* — Christopher Kingsbury Glover
(74) *Attorney, Agent, or Firm* — Samantha Updegraff; Medley, Behrens & Lewis, LLC (57) ABSTRACT

A laser-strike detection system includes an imaging sensor mounted on a platform, and a computing device. The imaging sensor outputs image frames that are each representative of a portion of the platform at a different time, during which a laser may be striking the platform. The computing device receives the image frames, and computes a delay map that indicates time-of-arrival delays of the laser beam at points on the portion of the platform. The computing device converts the delay map to a path-length variation map by multiplying the delay map by the propagation speed of light. The computing device fits a plane to the path-length variation map constrained by a topological model of the platform. The computing device computes angular deflections in x- and y-directions based upon the fit, which angular deflections define a direction from the platform to an emitter of the laser beam.

20 Claims, 8 Drawing Sheets

(56) References Cited

U.S. PATENT DOCUMENTS

2022/0189109 A1* 6/2022 Panteleev ............ G06T 15/506

OTHER PUBLICATIONS

"LeonardoS1223", Jun. 11, 2019, 3 Pages.
Roque, Ashley, "ArmyCompetition2018", Nov. 6, 2018, 2 Pages.
Scott, Richard, "NavyOffAxis2016", Mar. 8, 2016, 2 Pages.
Degrassie, et al., "NavyLITSABR2016", https://futureforce.navyline.dodlive.mil/2016/03/welcome-to-the-age-of-lasers/, Mar. 2, 2016, 4 Pages.
"NATO2012", Jul. 31, 2020, 1 Page.
"LWR2013", https://customer.janes.com/Janes/Display/jav_1025-jc4ia, Jul. 31, 2020, 1 Page.
"RALM-01/V2 Laser Warning Receiver (LWR)", https://customer.janes.com/Janes/Display/jav_9922-jc4ia, Jul. 31, 2020, 1 Page.
"AN/AVR-2A(V)2009", https://customer.janes.com/Janes/Display/jav_1275-jc4ia, Jul. 31, 2020, 1 Page.
"ATLAS", https://customer.janes.com/Janes/Display/jav_9884-jc4ia, Jul. 31, 2020, 1 Page.
"PA7030; 2008", https://customer.janes.com/Janes/Display/jav_1149-jc4ia, Jul. 31, 2020, 1 Page.
"Selex 2005", https://customer.janes.com/Janes/Display/jeos1027-jc4ia, Jul. 31, 2020, 1 Page.
"RALM-01;2005", https://customer.janes.com/Janes/Display/jav_1090-jfa, Jul. 31, 2020, 1 Page.
"Common Opto-electronic Laser Detection System (COLDS) NG", In C4ISR & Mission Systems: Maritime, Aug. 21, 2017, 3 Pages.
"SSC-1 OBRA; SSP-1 OBRA-3", In Land Warfare Platforms: System Upgrades, May 3, 2017, 5 Pages.
"PCO SSC-1 OBRA protection and laser warning system", In Land Warfare Platforms: System Upgrades, Jun. 15, 2017, 4 Pages.
"LWS-20V-3 laser warning system", In C4ISR & Mission Systems: Air, Feb. 8, 2017, 2 Pages.
"Integrated defensive aids suite", In C4ISR & Mission Systems: Air, Jul. 11, 2017, 4 Pages.
IDAS/CIDAS Range of Integrated Defensive Aids Suites, In SAAB, Aug. 2010, 5 Pages.
"Raytheon AN/AVR-3(V) airborne laser warning sytem", In C4ISR & Mission Systems: Air, Mar. 14, 2008, 2 Pages.
"AN/AVR-2A(V)/-2B(V) laser detecting set", In C4ISR & Mission Systems: Air, Jul. 20, 2017, 3 pages.
"Threat Warning Equipment", In C4ISR & Mission Systems: Air, Nov. 30, 2017, 3 Pages.
"Thales LWD 3 laser warning system", In Land Warfare Platforms: System Upgrades, Jul. 29, 2009, 3 Pages.
"Laser Warning System: Enhances survivability in hostile environments", www.thalesgroup.com/UK, 2012, 3 Pages.
"UTC Aerospace Systems AN/VVR-3 laser detection set", In Land Warfare Platforms: System Upgrades, Nov. 10, 2017, 3 Pages.
"1223 laser warning receiver", In C4ISR & Mission Systems: Air, Feb. 6, 2017, 2 Pages.
"ALTAS-2Q and -2QB", In C4ISR & Mission Systems: Air, Mar. 31, 2017, 2 Pages.
"ALTAS Laser Warning Receiver (LWR)", In C4ISR & Mission Systems: Air, Jul. 21, 2008, 2 Pages.
"PA7030 laser warning equipment", In C4ISR & Mission Systems: Air, Jan. 11, 2008, 2 Pages.
"ISSYS-POD", In C4ISR & Mission Systems: Air, Nov. 21, 2017, 6 Pages.
"RALM 01/V2", In C4ISR & Mission Systems: Air, Feb. 6, 2017, 5 Pages.

* cited by examiner

BROAD-AREA LASER AWARENESS SENSOR

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Laser strikes against commercial aircraft have become a significant problem for commercial aviation. The Federal Aviation Administration (FAA) has reported thousands of laser strikes against aircraft in the United States each year between 2016 and 2020. A laser strike against an aircraft is commonly detected by the aircraft's pilot when the laser impinges on the cockpit of the aircraft, potentially obscuring the vision of the pilot.

Various electronic systems for detecting laser strikes have also been developed. These systems generally use optical sensors, mounted on an aircraft, to detect direct impingement of laser beams on the sensors. While these direct-impingement systems are capable of detecting laser strikes that miss the cockpit and therefore have not yet directly interfered with a pilot's vision, direct-impingement systems are only capable of detecting strikes that impinge at the place where the sensor is located. It is impractical to cover an aircraft completely in optical sensors, and so many laser strikes may be missed. Furthermore, conventional laser-detection systems may only indicate an origin of a laser that strikes the aircraft in a very general sense. For instance, if a conventional optical sensor detects a laser strike on a starboard side of the aircraft, a laser detection system can indicate that the laser originates from somewhere to starboard, but generally provides no further information.

SUMMARY

The following is a brief summary of subject matter that is described in greater detail herein. This summary is not intended to be limiting as to the scope of the claims.

Various technologies pertaining to detecting laser strikes on a platform are described herein. With more particularity, systems and methods for detecting laser strikes on a platform and determining a direction a laser beam was emitted are described herein.

In exemplary embodiments, a laser-strike detection system includes an imaging sensor, an optical system, and a computing device or hardware logic component. The optical system is configured to collect, from a field-of-view (FOV) of the optical system, light that is reflected or scattered from a platform, such as an aircraft, a spacecraft, a ground vehicle, a building, or the like. The optical system is further configured to form an image of the FOV at the imaging sensor. The imaging sensor outputs image frames that are each representative of an image formed at the imaging sensor by the optical system at a different time. Thus, the imaging sensor outputs image frames that are representative of the FOV.

During a laser strike on a portion of the platform in the FOV, the imaging sensor outputs image frames that are representative of images of the FOV over a period of time. The computing device receives the image frames, and determines, based upon the image frames, a direction from which the laser beam was emitted.

In exemplary embodiments, the computing device computes, based upon the image frames, a time-of-arrival of scattered laser light at the imaging sensor from various points on the portion of the platform in the FOV. The computing device can compute a delay map that indicates time-of-arrival delays of the laser beam at the points on the portion of the platform in the FOV, relative to a baseline time of arrival, based upon the computed times-of-arrival at the imaging sensor, and based further upon a delay profile. The delay profile can be indicative of distances from the various points on the portion of the platform to the imaging sensor, or based upon a topographical map of the platform.

The computing device can be further configured to determine a direction from which the laser beam was emitted based upon the delay map. In an exemplary embodiment, the computing device converts the delay map to a path-length variation map by multiplying the delay values indicated by the delay map by the propagation speed of light in the relevant medium (e.g., 299,792,458 m/s in vacuum). The computing device then executes a fitting algorithm to identify a fit orientation of a model of the local geometry of the platform to the path-length variation map, represented as a three-dimensional path-length variation surface. The fit orientation of the model indicates slopes in orthogonal x- and y-directions. The computing device can then compute angular deflections in the x- and y-directions, which angular deflections define a direction from the platform struck by the laser to an emitter of the laser beam.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to detecting laser strikes on a platform such as an aircraft or a spacecraft are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1A:
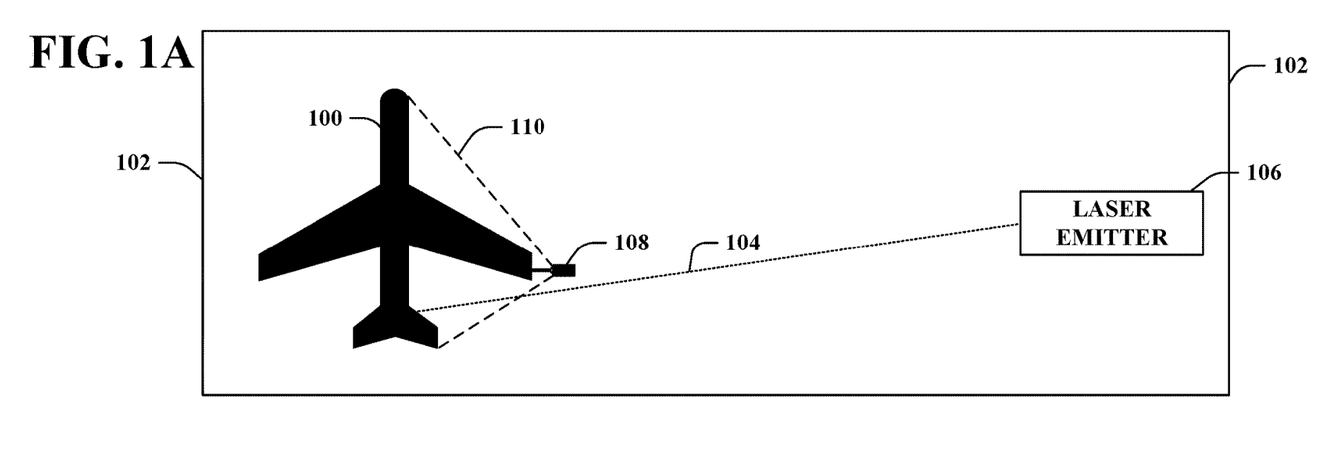
FIG. 1A is a top-down view of an exemplary operational environment of a platform.
Figure 1B:
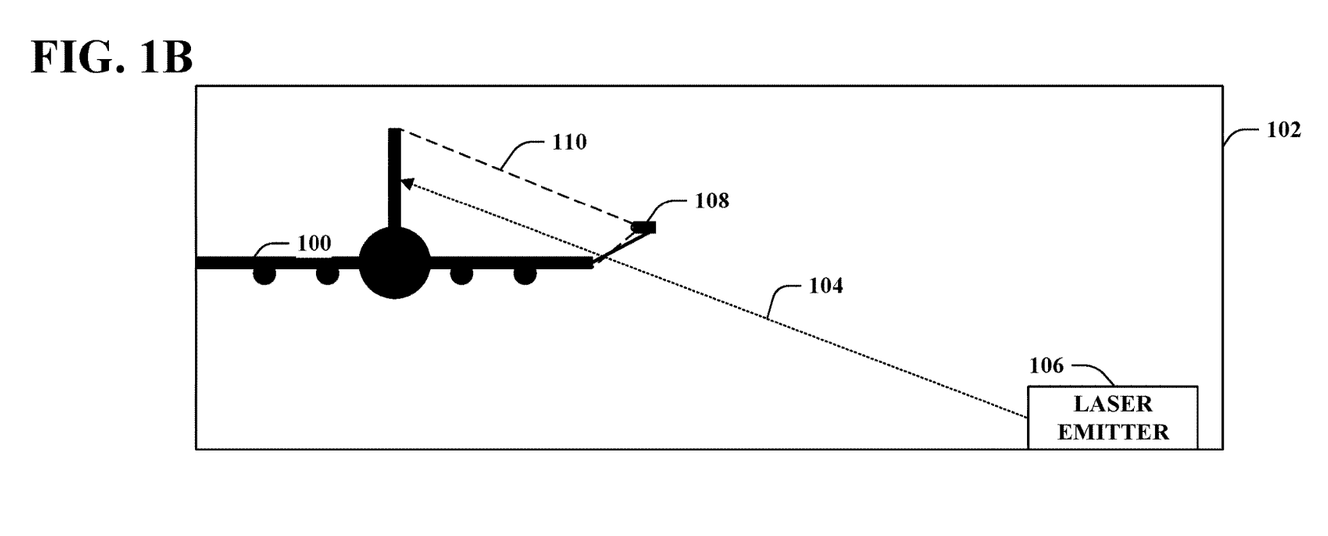
FIG. 1B is a head-on view of the exemplary operational environment depicted in FIG. 1A.

With reference to FIGS. 1A and 1B, an exemplary platform 100 that is configured to detect strikes of a laser beam on the platform 100 and to determine the direction of emission of the laser beam is illustrated. In various exemplary embodiments, the platform 100 can be a mobile platform such as an aircraft, a spacecraft, a ground vehicle, a ship or boat, or the like. In other embodiments consistent with the present disclosure, the platform 100 can be a stationary platform such as a building, an antenna tower, a bridge, or other structure on which laser strikes are desirably detected.

FIGS. 1A and 1B depict the platform 100 in an exemplary operational environment 102 of the platform 100. In FIGS. 1A and 1B, the platform 100 is depicted as an aircraft, however, it is to be understood that the aspects described in greater detail below are not so-limited. FIG. 1A depicts a top-down view of the operational environment 102. FIG. 1B depicts a head-on view of the operational environment 102, looking from the rear of the platform 100.

In the operational environment 102, the platform 100 can be struck by a laser beam 104 that is emitted by a laser emitter 106. The laser beam 104 can be, for instance, a ranging beam that is emitted by the laser emitter 106 in connection with using the laser emitter 106 to identify a range from the emitter 106 to the platform 100. In other examples, the laser beam 104 can be a beam emitted by a malicious or hostile actor seeking to disrupt operation of the platform 100 or interfere with vision of a pilot of the platform 100.

Conventionally, to detect that the laser beam 104 was striking the platform 100, an optical sensor would be placed on a surface of the platform 100. A laser strike would be detected when the laser beam 104 impinged on the optical sensor. This conventional approach is generally only able to detect laser strikes that directly impinge on the optical sensor. In other words, according to the conventional approach, if the laser beam 104 did not strike a particular location at which the optical sensor was placed, the optical sensor would be unable to detect that a laser strike occurred.

In contrast with this conventional approach, the platform 100 includes an imaging system 108 that is configured to generate image frames that are representative of an FOV 110 that includes a portion of the platform 100. In exemplary embodiments, the FOV 110 can include substantially the entirety of the platform 100 that can be viewed from a particular direction. In other embodiments, the FOV 110 can be limited to a smaller portion of the platform 100. As will be described in greater detail below, the platform 100 can be configured to detect that the laser beam 104 has struck the platform 100 based upon image frames generated by the imaging system 108. Still further, the platform 100 can be configured to identify, based upon the image frames, a direction of emission of the laser beam 104 from the emitter 106. Stated differently, the platform 100 can determine a direction from the platform 100 to the laser emitter 106 based upon the image frames.

Figure 2:
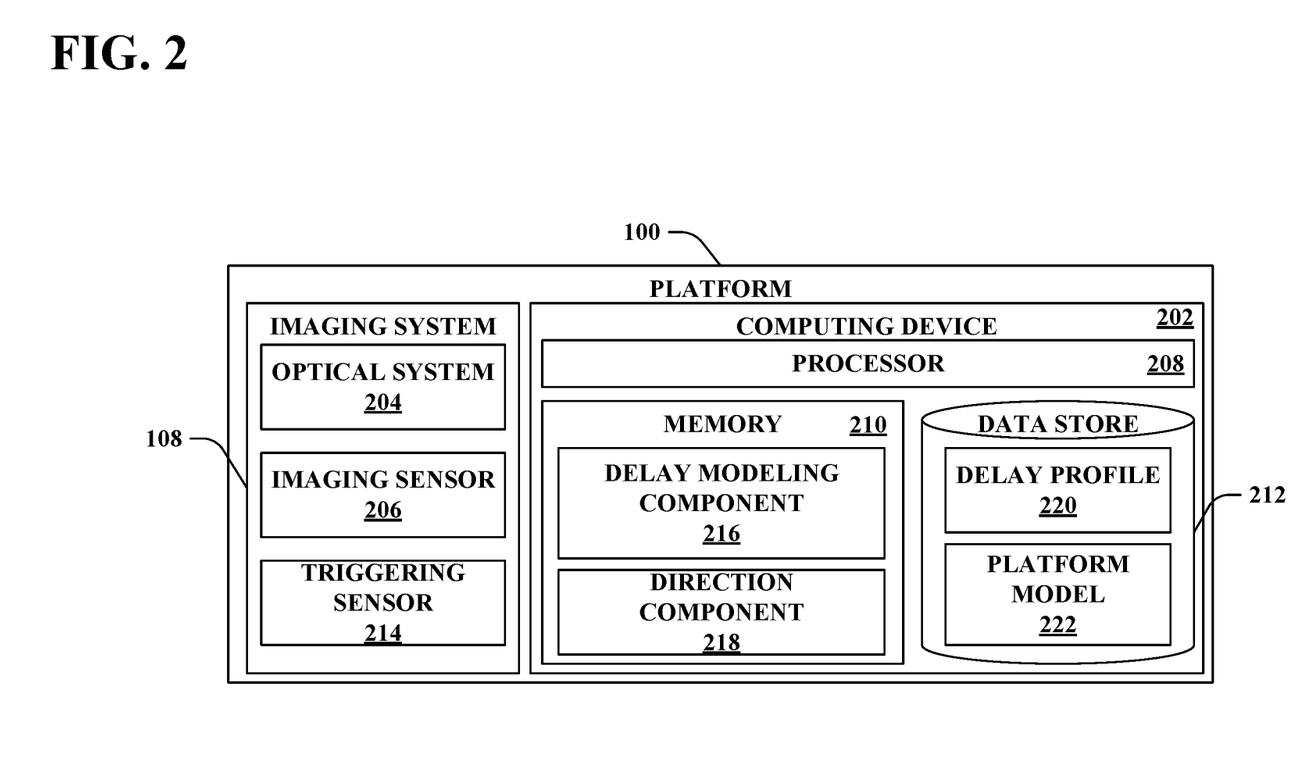
FIG. 2 is a detailed functional block diagram of the platform illustrated in FIGS. 1A and 1B.

With reference now to FIG. 2, a functional block diagram is shown, which illustrates certain detailed aspects of the exemplary platform 100. The platform 100 includes the imaging system 108 and a computing device 202. The imaging system 108 includes an optical system 204 and an imaging sensor 206. The computing device 202 includes a processor 208, memory 210 that includes instructions that are executed by the processor 208, and a data store 212 that stores computer-readable data that can be stored and/or retrieved by the processor 208. In other embodiments, functionality of the computing device 202 can be performed by a hardware logic component such as a field-programmable gate array (FPGA), an application-specific integrated circuit (ASIC), or the like. Briefly, and as explained in greater detail below, the imaging system 108 generates image frames that are representative of the FOV 110, and the computing device 202 computes a direction from the platform 100 to the laser emitter 106 based upon the image frames.

As used herein, the term "image frames" is intended to distinguish from images formed by the optical system 204 at the imaging sensor 206. In other words, the optical system 204 optically forms an image of the FOV 110 at the imaging sensor 206, and the imaging sensor 206 outputs image frames that are representative of the formed image. The term "image frames" is intended to include computer-readable image files conforming to image frames formats such as JPEG, TIFF, GIF, or the like. In other examples, image frames can be or include a plurality of digital values that are each representative of a readout of a respective light-sensitive pixel cell (LSPC) included in the imaging sensor 206. These digital values are referred to herein as pixel values.

Exemplary operations of the platform 100 are now described with respect to FIG. 2. The imaging system 108 is configured to generate a plurality of image frames that are representative of a portion of the platform 100 that lies within the FOV 110. The optical system 204 can be or include one or more optical elements that are collectively configured to form an image of the FOV 110 at the imaging sensor 206. For instance, the optical system 204 can include one or more lenses, mirrors, filters, apertures, or the like, which are jointly arranged, aligned, and/or coupled so as to direct light that is scattered from the portion of the platform 100 that lies within the FOV 110 to the imaging sensor 206. In a non-limiting example wherein the platform 100 is an aircraft, the optical system 204 can include an imaging objective positioned on a wingtip of the aircraft such that the objective receives light scattered from locations on substantially the entirety of one side of the aircraft. In the example, the optical system 204 can further include a combination of lenses, mirrors, or the like that are configured to direct the light received by the optical objective to a position of the imaging sensor 206. Thus, the optical system 204 can facilitate positioning of the imaging sensor 206 proximal to an electrical power source or a communications interface (e.g., a communications bus), while allowing the FOV 110 to originate elsewhere.

The imaging sensor 206 is optically coupled to the optical system 204 such that an image of the FOV 110 is formed at the imaging sensor 206. The imaging sensor 206 is configured to output image frames that are representative of light received from the portion of the platform 100 that is within the FOV 110. The imaging sensor 206 is a high-speed imaging sensor. In exemplary embodiments, the imaging sensor 206 can have a frame rate of gigaframes-per-second. Stated differently, the imaging sensor 206 can be configured to output an image frame as frequently or more frequently than once every nanosecond. Stated yet another way, sequential image frames output by the imaging sensor 206 depict the FOV 110 at times that are less than or equal to one nanosecond apart in time. In other embodiments, sequential image frames output by the imaging sensor 206 depict the FOV 110 at times that are less than or equal to 2 nanoseconds apart in time, less than or equal to 1.5 nanoseconds apart in time, less than or equal to 1.25 nanoseconds apart in time, less than or equal to 0.75 nanoseconds apart in time, or less than or equal to 0.5 nanoseconds apart in time. Other frame rates are also contemplated as being within the scope of the present disclosure. For example, the imaging sensor 206 can have a frame rate of greater than or equal to $10^8$ frames per second. The high speed of the imaging sensor 206 allows the imaging sensor 206 to capture, in sequential image frames, differences in time at which a beam of light reaches different portions of the platform 100. Since light travels approximately one foot in one nanosecond of time, an image sensor with an integration time longer than about one or two nanoseconds may lose valuable information pertaining to propagation of the laser beam 104 over the platform 100.

It is to be understood that the platform 100 can include multiple imaging systems 108 that are configured to generate image frames of different portions of the platform 100. For example, the imaging system 108 can be configured to generate image frames depicting a starboard side of the platform 100, as shown in FIGS. 1A and 1B. The platform 100 can further include additional imaging systems (not shown) that are configured to generate image frames depicting the port side of the platform 100, a rear of the platform 100, a front of the platform 100, a top of the platform 100, a bottom of the platform 100, or a smaller portion of any of the aforementioned portions of the platform 100. In some embodiments, a number and position of imaging systems about the platform 100 can depend on a resolution of imaging sensors (e.g., the imaging sensor 206) employed in the imaging systems. For instance, a number and position of the imaging systems can be selected based upon an expected spot-size of the laser beam 104 at the platform 100, such that the imaging systems provide desired coverage of the platform 100 while generating image frames in which the spot of the laser beam 104 at the platform 100 subtends multiple pixels.

Referring once again to FIG. 2, the imaging system 108 can further include a triggering sensor 214. In exemplary embodiments, the triggering sensor 214 can be placed proximally to the imaging sensor 206, such that the triggering sensor 214 can detect that light is being scattered from the surface of the portion of the platform 100 that is within the FOV 110. In some embodiments, the triggering sensor 214 can be included on a same integrated circuit die as the imaging sensor 206 to provide low trigger latency. The triggering sensor 214 can be configured to detect whether light scattered from the platform 100 in the FOV 110 exceeds a threshold value that indicates that the laser beam 104 is potentially striking the platform 100. If the scattered light exceeds the threshold, the triggering sensor 214 can cause the imaging sensor 206 to begin outputting image frames to the computing device 202. In some embodiments, the imaging sensor 206 can generate image frames at a rate that is higher than a data throughput rate of an interface between the imaging sensor 206 and the computing device 202. The triggering sensor 214 can control the imaging sensor 206 such that the imaging sensor 206 only generates image frames when it is likely that a laser strike is occurring, thereby limiting the likelihood that the output of the imaging sensor 206 exceeds the throughput of the communications interface with the computing device 202.

The triggering sensor 214 can comprise a high-speed photodetector and an analog or digital circuit that processes an output of the photodetector to allow the triggering sensor 214 to distinguish between scattered high-intensity, short-duration pulses of light that are commonly output by lasers, and relatively low-intensity but long-duration light such as background daytime solar illumination. In exemplary embodiments, the triggering sensor 214 can have a detection frequency that is no less than half of the frame rate of the imaging sensor 206, no less than 75% of the frame rate of the imaging sensor 206, no less than 90% of the frame rate of the imaging sensor 206, or that is greater than or equal to the frame rate of the imaging sensor 206. In exemplary embodiments, triggering sensor 214 comprises a photodiode, avalanche photodiode, or photomultiplier tube having photocurrent rise-time of one nanosecond or less and analog or digital componentry configured to perform high-pass or bandpass filtering and amplification. For laser pulses that have a long duration as compared to nanoseconds, the triggering sensor 214 can be configured to trigger on an edge of surges or fades of intensity of light, which may be naturally induced by the atmosphere and is commonly referred to as atmospheric scintillation.

The imaging sensor 206 outputs the image frames that it generates to the computing device 202. The computing device 202 is configured to determine a direction from the platform 100 to the laser emitter 106 based upon the image frames generated by the imaging sensor 206. With more particularity, the memory 210 includes a delay modeling component 216 and a direction component 218. As is described in greater detail below, the delay modeling component 216 is configured to compute, based upon the image frames, a delay map that indicates a time at which the laser beam 104 strikes various locations on the platform 100. The direction component 218 is configured to compute, based upon the delay map generated by the delay modeling component 216, a direction from the platform 100 to the laser emitter 106, which direction can be expressed in three-dimensional space as a pair of angles disposed about orthogonal axes.

Figure 3:
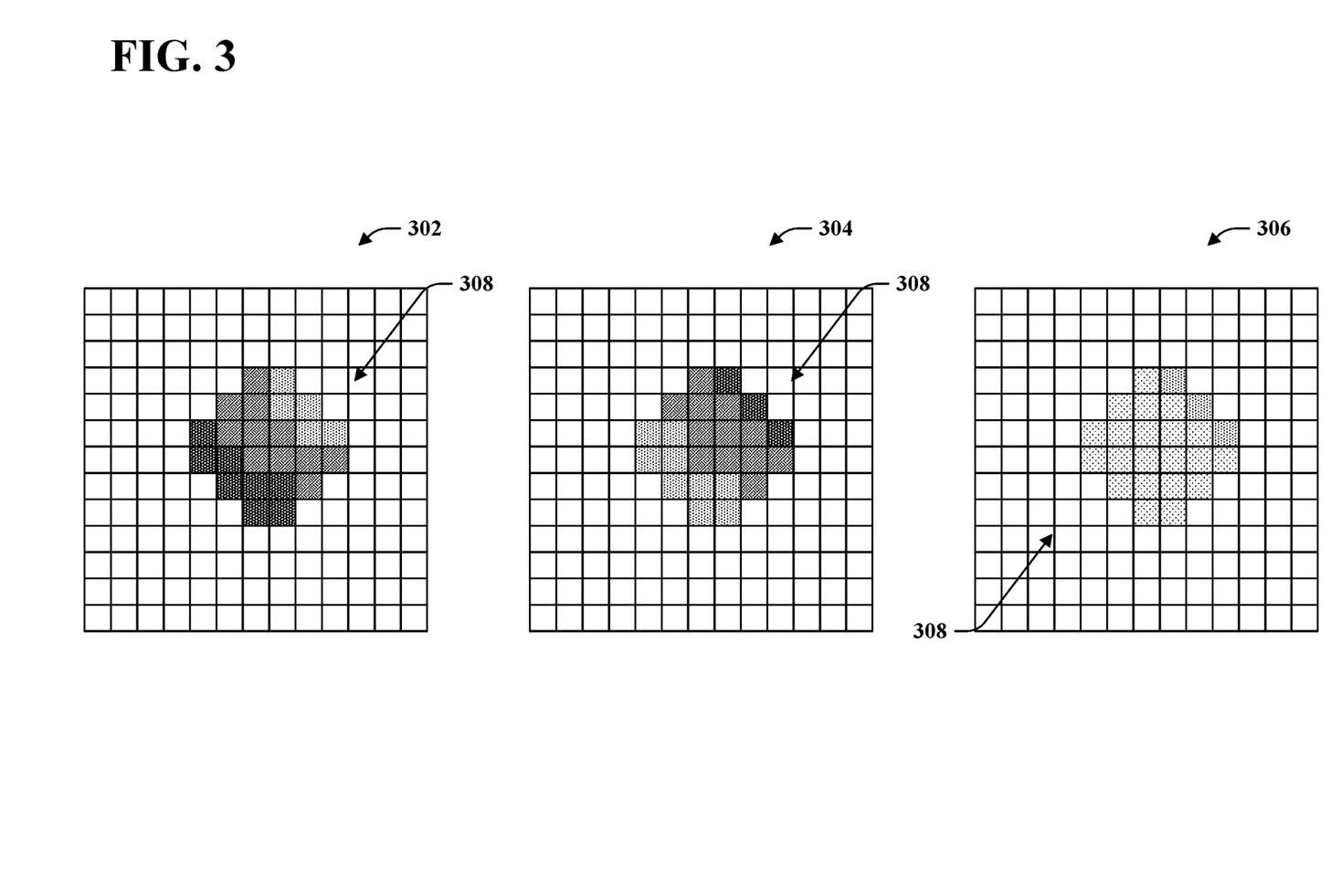
FIG. 3 illustrates exemplary image frames depicting a laser strike at multiple times.

Referring now to FIG. 3, a plurality of exemplary image frames 302-306 are illustrated. The image frames 302-306 can be, for example, image frames that depict a portion of the platform 100 such as a portion of a wing of the platform 100, a portion of a fuselage of the platform 100, or the like. It is to be understood that the image frames generated by the imaging sensor 206 can have many more pixels than are shown in the image frames 302-306. For example, each of the image frames generated by the imaging sensor 206 can comprise greater than or equal to 512×512 pixels, 512×1024 pixels, greater than or equal to 1024×1024 pixels, or greater than or equal to 2048×2048 pixels.

The image frames 302-306 each depict a same portion of the platform 100 at a different time. For instance, the image frame 302 can be representative of the portion of the platform 100 at a first time $t_1$, the image frame 304 can be representative of the portion of the platform 100 at a second time $t_2$, and the image frame 306 can be representative of the portion of the platform 100 at a third time $t_3$. The time $t_2$ can be one nanosecond after $t_1$, and the time $t_3$ can be one nanosecond after $t_2$. The pixels of the image frames 302-306 can have values that are indicative of an intensity of light received at the imaging sensor 206 from a location on the platform 100 corresponding to the pixel. The images 302-306 depict a laser spot 308 that is incident on the portion of the platform 100 depicted in the images 302-306. The laser beam 104 can have a non-uniform temporal energy distribution. For example, the laser beam 104 can have a Gaussian temporal energy distribution such that for a pulse of the laser beam 104 the energy-intensity of the light rises over time and then falls again. In another example, the non-uniform temporal energy distribution of the laser beam 104 as it strikes the platform 100 may be naturally induced by atmospheric scintillation.

Due to positioning and orientation of the platform 100 and/or non-uniform topology of the platform 100, the laser beam 104 may need to travel a longer distance to reach some parts of the platform 100 than other parts. Thus, as shown in the first image frame 302, the laser spot 308 can have a greater intensity at the first time $t_1$ toward a lower-left portion of the image frame 302 than toward an upper-right portion of the image frame due to a portion of the platform 100 represented by the lower-left portion of the frame 302 being positioned closer to the laser emitter 106 than a portion of the platform 100 represented by the upper-right portion of the frame 302. At the time $t_2$, the laser spot 308 has a lower intensity toward the lower-left portion of the frame 304, due to the laser intensity of the beam 104 falling after the peak of its non-uniform temporal energy distribution, whereas the laser spot 308 has a higher intensity toward the upper-right portion of the frame 304. Finally, the laser spot 308 has a still-lower intensity across the third image frame 306 as the intensity of the laser beam 104 falls off toward the end of the temporal energy distribution of the pulse.

Referring once again to FIG. 2, the delay modeling component 216 is configured to identify a time-of-arrival of the laser beam 104, or a delay in the time-of-arrival relative to a baseline time, at each of a plurality of pixel locations in a sequence of image frames generated by the imaging sensor 206, based upon the differing intensities of the pixels over time. The delay modeling component 216 receives a plurality of image frames from the imaging sensor 206. The plurality of image frames each depict a laser spot that strikes a surface of the platform 100 (e.g., the laser spot 308 depicted in the image frames 302-306 of FIG. 3). In the explanation of certain exemplary embodiments below, reference is made to a laser pulse, however, it is to be understood that various aspects can also be employed in connection with detecting strikes of a continuous laser beam. In particular, various aspects described below can be applied to surges or fades in laser intensity induced by atmospheric scintillation on laser beams that are emitted continuously or as long pulses (e.g., having pulse duration longer than about 10 nanoseconds, longer than about 50 nanoseconds, or longer than about 100 nanoseconds) by the laser source 106.

Figure 4:
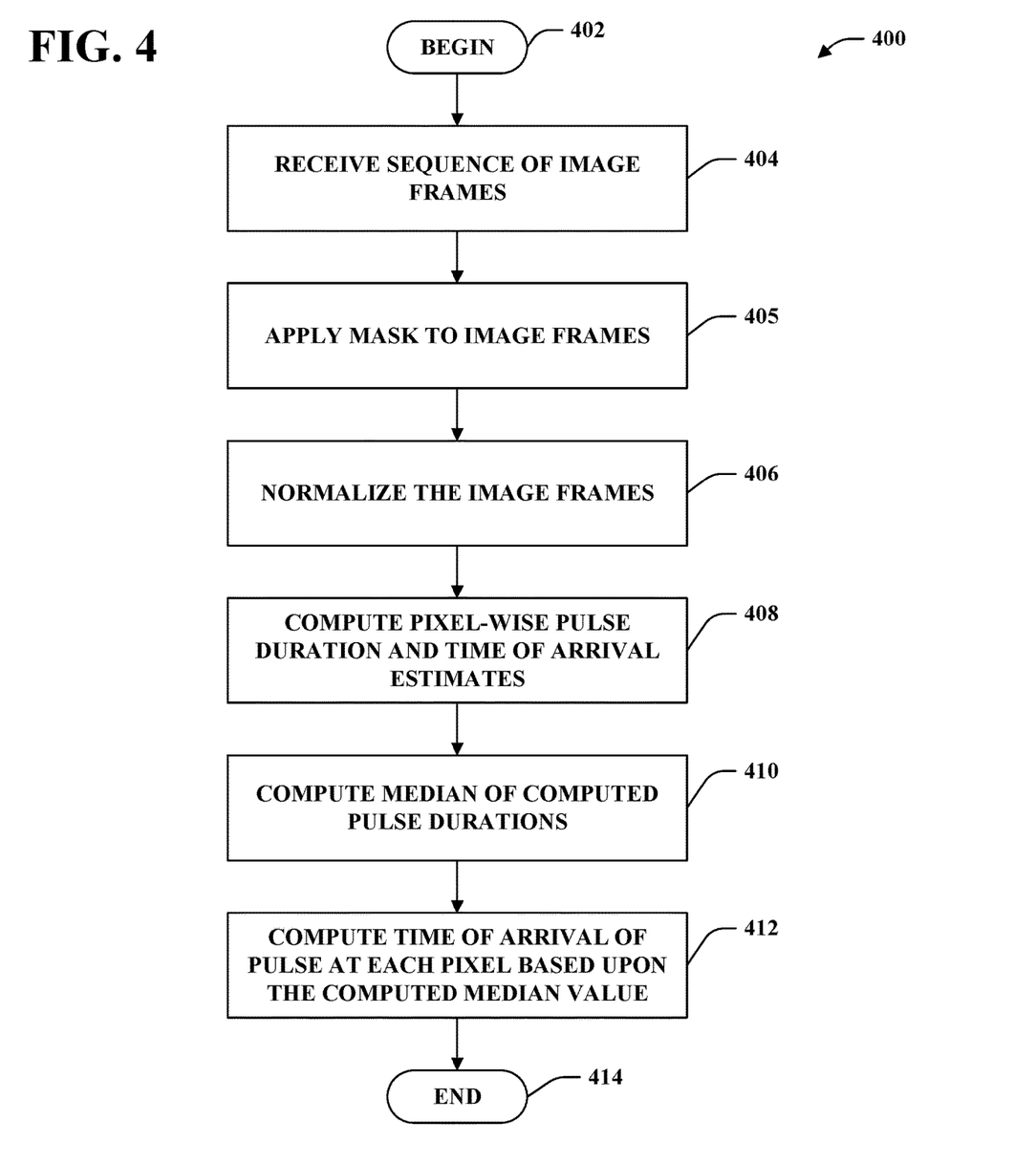
FIG. 4 is a flow diagram that illustrates an exemplary methodology for computing a delay map based upon a sequence of image frames.
Figure 5:
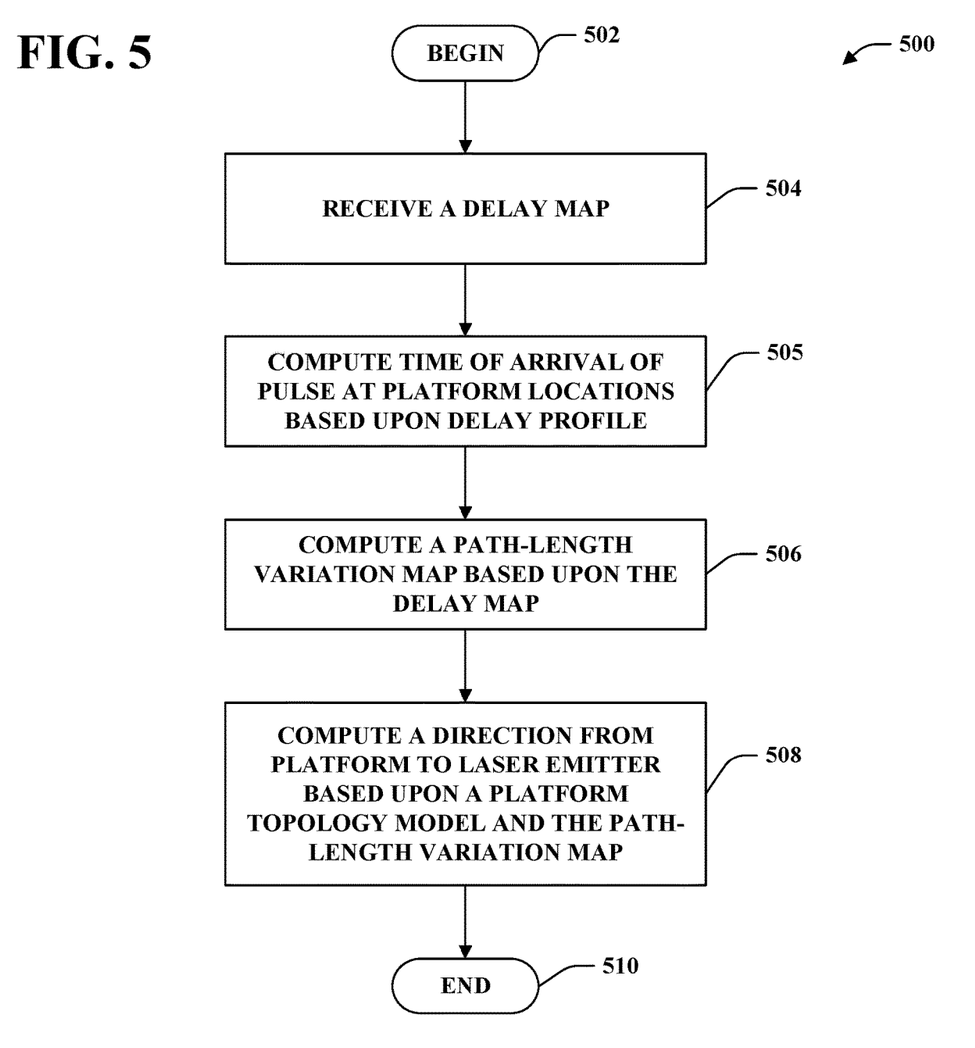
FIG. 5 is a flow diagram that illustrates an exemplary methodology for computing a direction from a platform to a laser emitter based upon a delay map.
Figure 7:
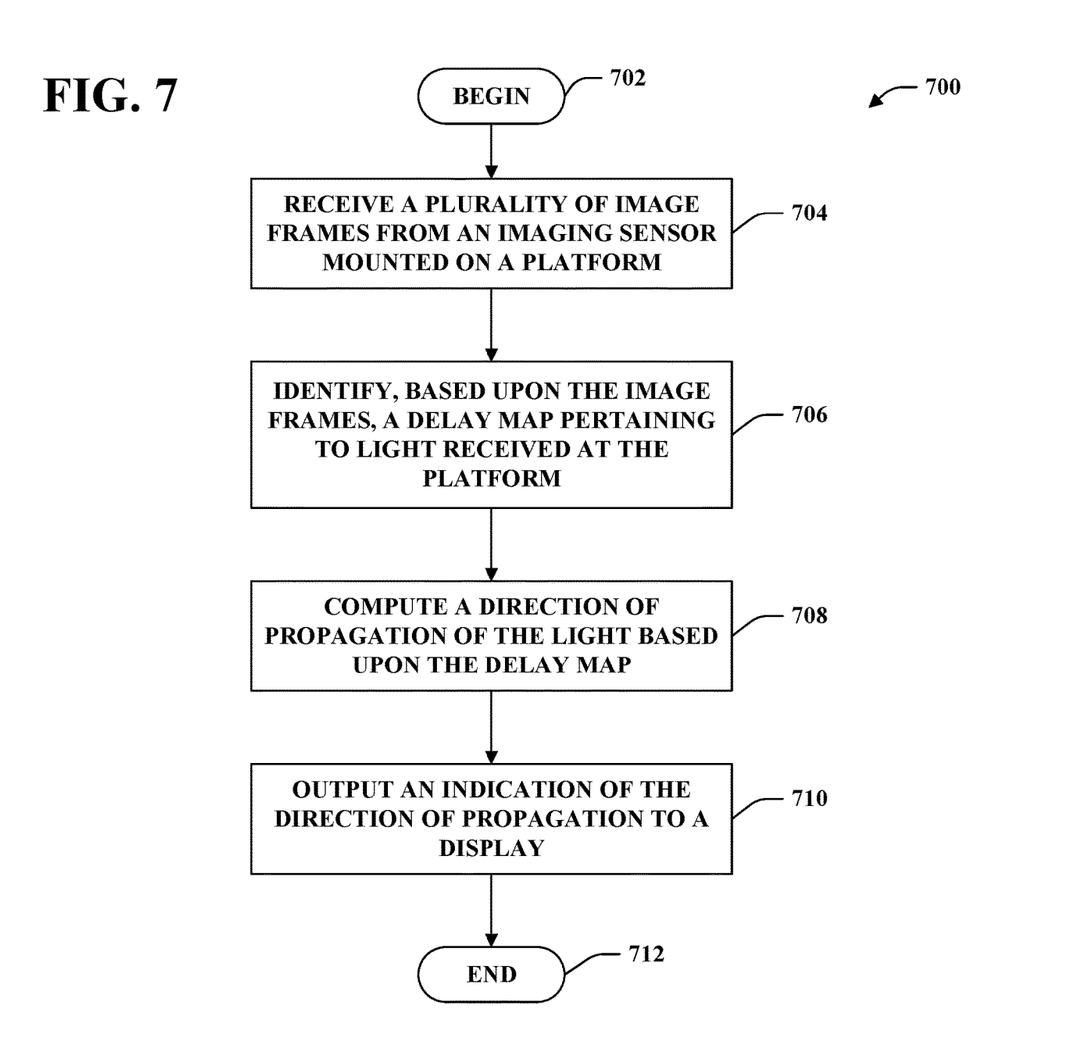
FIG. 7 is a flow diagram that illustrates an exemplary methodology for computing a direction of propagation of a laser beam that strikes a platform based upon a sequence of image frames depicting the platform.

FIGS. 4, 5, and 7 illustrate exemplary methodologies relating to determining a direction from the platform 100 to the laser emitter 106. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like. In still further embodiments, the acts described herein can be performed by an FPGA or an ASIC.

Referring now to FIG. 4, an exemplary methodology 400 that is performed by the delay modeling component 216 in connection with determining a time of arrival of a laser pulse at various locations on the platform 100 is illustrated. The methodology 400 begins at 402 and at 404, the delay modeling component 216 receives a sequence of image frames from the imaging sensor 206. The sequence of image frames can include substantially any number of image frames. In exemplary embodiments, the sequence of image frames comprises four image frames, eight image frames, or sixteen image frames. In some embodiments, a number of image frames used by the delay modeling component 216 in connection with performing the methodology 400 can be based upon an expected duration of a pulse of the laser beam 104. For example, the number of image frames can be selected so as to capture the entirety of a pulse of the laser beam 104 in the sequence of image frames. In other words, the sequence of image frames can be representative of a period of time that is at least as long as an expected value of the pulse of the laser 104. In still other embodiments, the number of image frames can be selected so as to capture an expected duration of an atmospherically induced surge or fade of intensity of the laser beam 104. Pixel values of the pixels of the image frames are indicative of light received at corresponding LSPCs on the imaging sensor 206. Each pixel of each of the image frames receives light from a different respective location on the platform 100 within the FOV 110. In other words, across the sequence of image frames, a same pixel location is representative of light scattered from a same location on the platform 100.

At 405, a mask is applied to the image frames to zero-out or remove pixels that are not likely to have been illuminated by the laser beam 104. In exemplary embodiments, the mask can be based upon modulation depth of pixels, defined as the difference between the maximum value of a pixel location and the minimum value of the pixel location across the multiple image frames. For instance, pixels the values of which do not vary, or vary only slightly, from frame to frame can be considered to be unlikely to have been illuminated by the laser beam 104. In exemplary embodiments, the mask is configured to zero-out or remove pixels from the image frames when the modulation depth of the corresponding pixel locations does not exceed a threshold modulation depth. In further embodiments, the mask can be based on a contiguousness criterion, such that the mask includes a single contiguous region of pixels.

At 406, the image frames are normalized, on a pixel-wise basis, according to a total intensity of light received by the imaging sensor 206 across the sequence of image frames, thereby generating normalized image frames. In an exemplary embodiment, the pixel values of a same pixel location can be divided by a sum of the pixel values at that same pixel location. Thus, a pixel value of a normalized image frame can be indicative of a fraction of the total signal received at that location across the set of image frames.

At 408, values of duration and time of arrival of a pulse of the laser beam 104 are computed based upon the normalized image frames on a pixel-wise basis. In other words, the delay modeling component 216 computes, for each pixel location across the sequence of normalized image frames, estimates of the duration of the laser pulse and a time of arrival of the laser pulse. In some embodiments, the estimates of the duration and time of arrival of the laser pulse can be computed only for pixels with values exceeding a threshold value in at least one of the image frames. This limitation can be used to exclude pixels that are unlikely to have been illuminated by the laser 104 during the time represented by the sequence of image frames received at 404.

The pulse duration and time of arrival estimates can be computed based upon a temporal model of energy of the laser pulse. For example, the instantaneous energy of the laser pulse over time can be modeled as a temporal Gaussian function. In another example, the instantaneous energy of the laser pulse over time can be modeled as a top-hat function. For laser emitters 106 whose pulse is long compared to tens or hundreds of nanoseconds or which is nearly continuous as emitted, instantaneous energy of the laser pulse arriving at imaging sensor 206 can be modeled as surges or fades induced by atmospheric scintillation, using mathematical models of surges or fades commonly known in the art of laser scintillation in the atmosphere. For a Gaussian temporal model, a signal level of the laser pulse for an mth frame in the sequence of image frames can be written as $$S_m = \frac{E}{2}\left(\text{erf}\left(2\sqrt{\ln(2)} \cdot \frac{T - m*(\Delta t + \delta t) + \delta t}{\tau_{FWHM}} + 2\sqrt{\ln(2)} \cdot \frac{\Delta t}{\tau_{FWHM}}\right) - \text{erf}\left(2\sqrt{\ln(2)} \cdot \frac{T - m*(\Delta t + \delta t) + \delta t}{\tau_{FWHM}}\right)\right) \quad \text{Eq. 1}$$

where $S_m$ is the signal level, E is the temporally integrated signal on a pixel, $\Delta t$ is a frame integration duration (i.e., a time over which light is collected at the imaging sensor 206 to generate a single image frame), $\delta t$ is the reset or dead time of pixels of the imaging sensor 206, T is the time at which peak pulse energy occurs, which is also described herein as the arrival time of the pulse, erf is an error function such as but not limited to an error function disclosed in Abramowitz, M. and Stegun, I. A. (Eds.). "Error Function and Fresnel Integrals." Ch. 7 in Handbook of Mathematical Functions with Formulas, Graphs, and Mathematical Tables, 9th printing. New York: Dover, pp. 297-309, 1972, and $\tau_{FWHM}$ is the full-width-at-half-maximum pulse duration. The delay modeling component 216 can employ a root-finding equation solver, applied independently to each pixel location, to solve an array of Eq. 1 representing the sequence of normalized frames. A solution output by the root-finding equation solver identifies, for each of the pixel locations, a best-fit estimated pulse duration $\tau_{FWHM}$ and arrival time T. The estimates of pulse duration and arrival time for each of the pixel locations are determined based upon the pixel values of the same corresponding pixel location across the sequence of image frames, independently of each of the other pixel locations. It is to be understood that the arrival time T for each of the pixel locations can be computed to sub-frame precision. In other words, the arrival time T is a continuous variable rather than a discrete set of values corresponding to times associated with the image frames.

In general, the pixel-wise pulse duration and time of arrival estimates computed at 408 will vary from pixel location to pixel location. However, there is only a single actual pulse duration. Accordingly, at 410, the delay modeling component 216 computes a median of the pulse duration estimates computed at 408. At 412, the median value computed by the delay modeling component 216 at 410 can be used as a constraint to re-compute an estimate of the time of arrival of the pulse at each of the pixel locations based upon the normalized image frames. The times of arrival computed at 412 collectively define a delay map for each of the pixel locations in the sequence of image frames. In other words, the times of arrival computed at 412 identify a time of arrival of a pulse of the laser beam 104 at each of a plurality of LSPCs of the imaging sensor 206. For long pulses, the times computed at 412 identify the times of arrival of a surge or fade in laser intensity induced by the atmosphere. The times of arrival computed at 412 can be considered pixel values of the delay map. In exemplary embodiments, the delay modeling component 216 can exclude from the delay map any pixel locations for which the pulse duration estimate computed at 408 was one or more, two or more, or three or more standard deviations away from the median pulse duration. The methodology 400 ends at 414.

The delay map computed at 412 can be considered a delay map of arrival of the laser beam 104 at LSPCs of the imaging sensor 206. Whereas the times of arrival computed at 412 are representative of times at which a laser pulse from the laser emitter 306 arrived at various LSPCs of the imaging sensor 206, the times at which the pulse arrived at the locations on the platform 100 from which the LSPCs receive scattered light are different and depend on the distance between the LSPCs and their corresponding imaged locations on the platform 100. Accordingly, and referring once again briefly to FIG. 2, the data store 212 can store a delay profile 220 that indicates, for each pixel location on the imaging sensor 206, a time it takes for light to reach the imaging sensor 206 upon being scattered from the platform 100. For example, the delay profile 220 can have a plurality of pixel locations, wherein each of the pixel locations of the delay profile 220 corresponds to a single respective LSPC on the imaging sensor 206. To further illustrate, the delay profile 220 can have a first pixel and a second pixel, wherein the first pixel of the delay profile 220 corresponds to a first LSPC on the imaging sensor 206 and the second pixel of the delay profile 220 corresponds to a second LSPC on the imaging sensor 206. The first LSPC receives light from a first location on the platform 100, and the second LSPC receives light from a second location on the platform 100. A value of the first pixel of the delay profile 220 indicates the time it takes for light to travel from the first location on the platform 100 to the first LSPC. A value of the second pixel of the delay profile 220 indicates the time it takes for light to travel from the second location on the platform 100 to the second LSPC.

Referring briefly once again to FIG. 2, the direction component 218 is configured to receive a delay map from the delay modeling component 216, and to output an indication of a direction from the platform 100 to the laser emitter 106 based upon the delay map and platform topology model 222 stored at the data store 212.

Referring now to FIG. 5, an exemplary methodology 500 that is performed by the direction component 218 is illustrated. The methodology 500 begins at 502 and at 504, the direction component 218 receives a delay map, such as the delay map computed at 412 (e.g., from the delay modeling component 216). At 505, the time of arrival of the pulse at platform locations corresponding to the delay map at the pixels of imaging sensor 206 can be computed based upon the delay profile 220, thereby generating a second delay map that is indicative of the time of arrival of the pulse at different locations on the platform 100. In an exemplary embodiment, the times of arrival at the platform locations are computed at 505 by subtracting the delay profile from the initial delay map. Stated differently, the second delay map can be generated by subtracting the delay profile 220 from the delay map received at 504. At 506, the direction component 218 computes a path-length variation map based upon the delay map computed at 505. The path-length variation map is substantially similar to the delay map computed at 505, but represents differences in times of arrival of the laser pulse at the various platform locations in terms of differences in distance traveled by the pulse. For instance, in embodiments wherein the delay map comprises pixel values that are representative of times of arrival of the laser pulse relative to a baseline time (i.e., as delays relative to the baseline time), the direction component 218 can directly convert the pixel values to path length variations by multiplying the pixel values by the speed of light (e.g., the speed of light in a medium in which the platform 100 is traveling, the speed of light in a vacuum, or the speed of light in air). The path-length variation map can have values denominated in, for example, meters.

Figure 6:
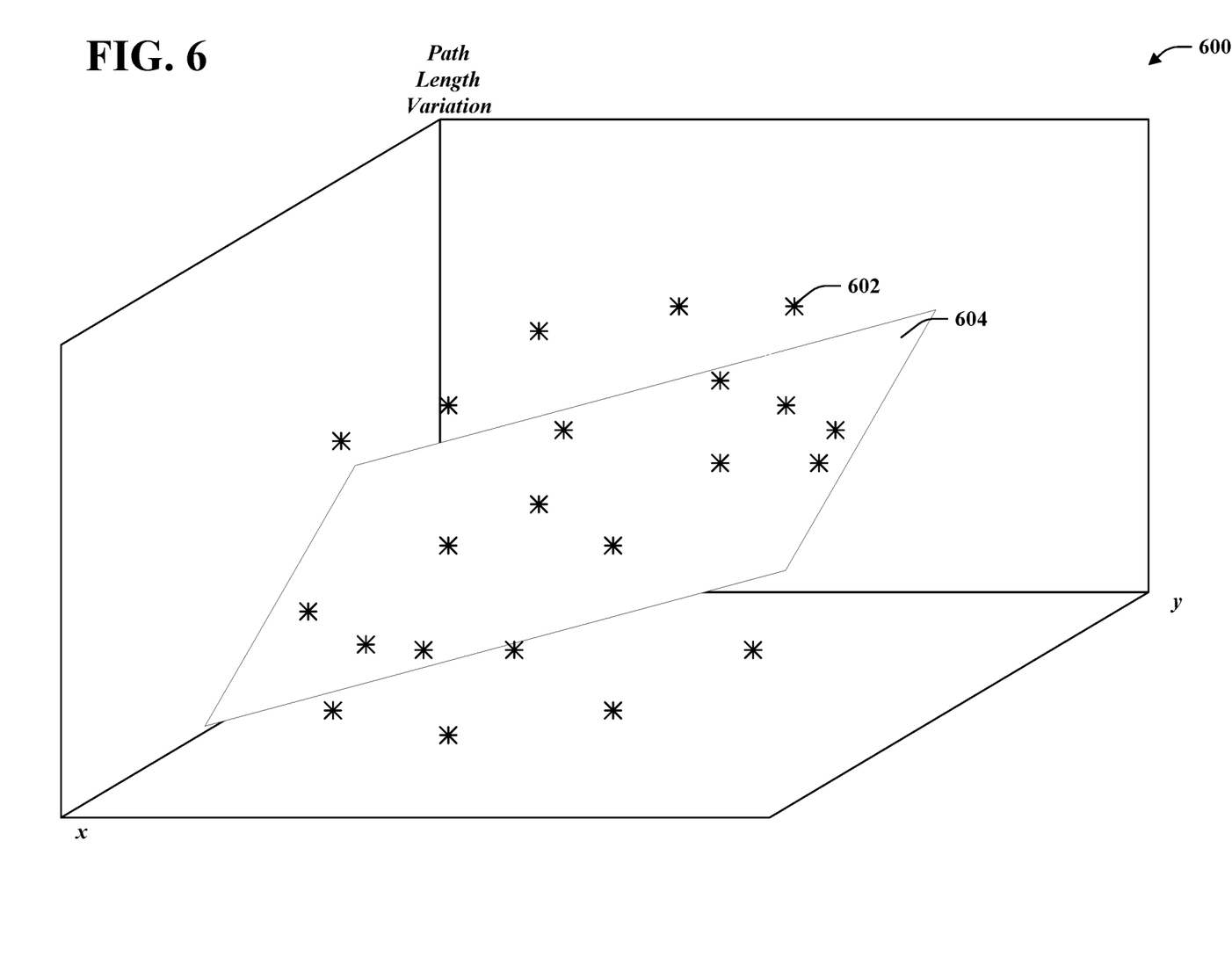
FIG. 6 is a conceptual diagram illustrating a fit between a topological model of a platform and a path-length variation map, which indicates slopes in orthogonal x- and y-directions.

At 508, a direction from the platform 100 to the laser emitter 106 is computed based upon the platform topology model 222 and the path-length variation map computed at 506. In exemplary embodiments, a direction from the platform 100 to the laser emitter 106 is found at 508 by fitting angles-of-arrival of laser beam 104 at platform 100 to be most consistent with the path-length variation map computed at 506 and the platform topology model 222. The platform topology model 222 is representative of geometry of the platform 100. In various embodiments, the platform topology model 222 can be or include a three-dimensional surface model of all or a portion of the platform 100. With reference now to FIG. 6, an exemplary path-length variation map 600 is illustrated as a series of points (e.g., the point 602) in a three-dimensional coordinate space, with x- and y-axes corresponding to a two-dimensional pixel location space of the platform topology model 222 and the z-axis corresponding to the path-length variation of points 602 relative to the platform topology model 222 (e.g., the values of the pixels of the path-length variation map). FIG. 6 further illustrates a plane 604 that is fitted to the points of the path-length variation map 600. The slope of the fitted plane 604 can be converted to a direction defined by angles ($\theta_x$, $\theta_y$). In some embodiments, the direction component 218 can be configured to fit less than a whole portion of the surface topology model to the path-length variation map. Whereas the geometry of the platform 100 as a whole may be complex, smaller portions of the platform 100 can have simplified geometries such as planar, cylindrical, or spherical surfaces. Thus, various planes (e.g., plane 604) can be fit to path length variation maps corresponding to portions of the platform topology model 222 less than the whole topology model 222 (e.g., subsets of the path length variation map computed at 506), which smaller portions may be able to be conveniently represented by simplified geometries such as planar, cylindrical, or spherical surfaces. The methodology 500 ends at 510.

In an exemplary embodiment, the direction component 218 identifies slopes $m_x$ and $m_y$ of the platform topology model in the x- and y-directions aligned to the coordinate frame of the platform topology model 222. Based upon the slopes $m_x$ and $m_y$, the direction component 218 can compute angles $\theta_x$ and $\theta_y$. The angles $\theta_x$ and $\theta_y$ define a direction from the platform model 222 to the laser emitter 106.

In various embodiments wherein the standoff distance between the origin of the FOV 110 (e.g., a location of an imaging objective of the optical system 204) and a flat surface of the platform 100 is small relative to a distance between the platform 100 and the laser emitter 106 (e.g., less than $1/100^{th}$, less than $1/1000^{th}$, or less than $1/10000^{th}$ of the distance between the platform 100 and the laser emitter 106), the angles $\theta_x$ and $\theta_y$ can be approximated by:

$$\tan(\theta_x) = \frac{x_0}{Z_0} = \frac{\left(m_x * \frac{f}{Z} - \frac{x_{p0} * \left(1 + \frac{f}{Z}\right)}{\sqrt{f^2 + x_{po}^2 + y_{p0}^2}}\right)}{\sqrt{1 - \left(\left(m_x * \frac{f}{Z} - \frac{x_{p0} * \left(1 + \frac{f}{Z}\right)}{\sqrt{f^2 + x_{po}^2 + y_{p0}^2}}\right)^2 + \left(m_y * \frac{f}{Z} \frac{y_{p0} * \left(1 + \frac{f}{Z}\right)}{\sqrt{f^2 + x_{po}^2 + y_{p0}^2}}\right)^2\right)}}$$

Eq. 2

$$\tan(\theta_y) = \frac{y_0}{Z_0} = \frac{\left(m_y * \frac{f}{Z} - \frac{y_{p0} * \left(1 + \frac{f}{Z}\right)}{\sqrt{f^2 + x_{po}^2 + y_{p0}^2}}\right)}{1 - \left(\left(m_x * \frac{f}{Z} - \frac{x_{p0} * \left(1 + \frac{f}{Z}\right)}{\sqrt{f^2 + x_{po}^2 + y_{p0}^2}}\right)^2 + \left(m_y * \frac{f}{Z} - \frac{y_{p0} * \left(1 + \frac{f}{Z}\right)}{\sqrt{f^2 + x_{po}^2 + y_{p0}^2}}\right)^2\right)}$$

Eq. 3 where $x_0$, $y_0$, and $z_0$ are x, y, and z coordinates of the laser source, $x_{p0}$ and $y_{p0}$ are physical locations of a selected LSPC on the imaging sensor 206, f is the focal length of the optical system 204, Z is the standoff distance between the optical system 204 and the platform 100, slopes $m_x$ and $m_y$ are the slopes of the fitted plane in the x- and y-directions. In this case, the angles $\theta_x$ and $\theta_y$ are angles of deflection between the optical axis of the optical system 204 and the emitter 106 of the laser beam 104. In the approximations above, since the surface of the platform 100 is flat, these angles are equivalent to angles to the laser emitter 106 relative to the platform model 222.

Referring once again to FIG. 2, the direction component 218 can output the angles $\delta_x$ and $\theta_y$ that are indicative of a direction from the platform 100 to the laser emitter 106. In various exemplary embodiments, the direction component 218 can output the angles $\theta_x$ and $\theta_y$ to a display (not shown) that can be included on the platform 100 such that a pilot of the platform 100 can execute an evasive maneuver or report the presence and location of the emitter 106 to ground-based authorities. In other exemplary embodiments, the direction component 218 can output the angles $\theta_x$ and $\theta_y$ to a control or navigation system of the platform 100, and the platform 100 can execute an evasive maneuver based upon the angles $\theta_x$ and $\theta_y$.

Referring now to FIG. 7, a methodology 700 that facilitates determining a direction of propagation of a laser that strikes a platform is illustrated. The methodology 700 begins at 702, and at 704, a plurality of image frames are received from an imaging sensor mounted on a platform. Each of the image frames is representative of a same field of view at a different respective time. At 706, a delay map is identified based upon the image frames, wherein the delay map indicates, for a plurality of locations on a surface of the platform, a time at which a beam of light (e.g., a pulse of a laser) was incident on the platform. The delay map can be identified or computed according to various exemplary operations described above with respect to the delay modeling component 216. At 708, a direction of propagation of the beam of light is computed based upon the delay map. In exemplary embodiments, the direction of propagation can be defined by a pair of angles that are indicative of deflection between an optical axis of an optical system that directs light to the imaging sensor and a location from which the beam of light originates. The direction of propagation of the light can be computed according to various exemplary operations described above with respect to the direction component 218. At 710, an indication of the direction of propagation is output to a display. For instance, in embodiments wherein the platform is an aircraft, an indication of the direction of propagation can be output to a display that is located in a cockpit of the aircraft to assist a pilot of the aircraft in taking necessary evasive action. The methodology 700 ends at 712.

Figure 8:
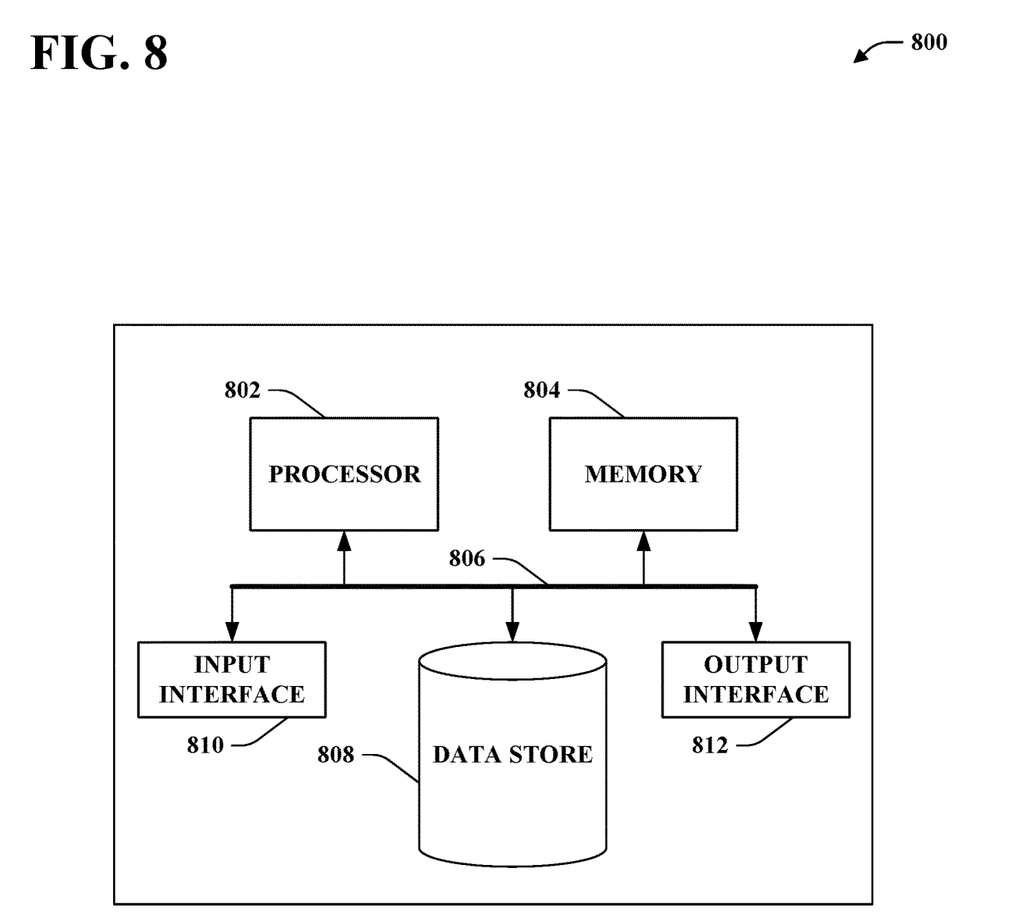
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that is configured to identify a direction from which a laser beam that strikes a platform that is depicted in a time-series of images was emitted. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store delay maps, the delay profile 220, a platform model such as the platform model 222, etc.

The computing device 800 additionally includes a data store 808 that is accessible by the processor 802 by way of the system bus 806. The data store 808 may include executable instructions, a delay profile, a platform model, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include FPGAs, ASICs, Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A laser warning system, comprising:
an imaging sensor that is mounted on a platform and configured to output image frames indicative of light received at the imaging sensor;
an optical system that is configured to form an image of a portion of the platform at the imaging sensor; and
a computing system or hardware logic component that is configured to perform the following acts:
receiving a plurality of image frames from the imaging sensor, each of the image frames representative of the portion of the platform at a different respective time in a period of time;
detecting an impingement of light upon the platform wherein the light is from a remote laser;
computing, based upon the image frames, a direction of propagation of a beam of the light that is incident on the platform during the period of time; and
outputting an indication of the direction of propagation of the beam of the light.

2. The laser warning system of claim 1, the acts further comprising computing, based upon the image frames, a delay map that indicates, for each of a plurality of locations on the portion of the platform, a time of incidence of a beam of light at the location, and wherein computing the direction of propagation of the beam of the light is based upon the delay map.

3. The laser warning system of claim 2, wherein computing the delay map is based upon a subset of pixels of the image frames, the subset of pixels of the image frames selected based upon a threshold modulation depth.

4. The laser warning system of claim 2, wherein computing the delay map is based upon a delay profile, the delay profile indicative of light propagation times from points on the portion of the platform to the imaging sensor.

5. The laser warning system of claim 4, wherein the delay profile is based upon a topological model of the portion of the platform.

6. The laser warning system of claim 4, wherein the delay map is a first delay map, wherein computing the first delay map comprises: computing a second delay map based upon the plurality of image frames; and subtracting the delay profile from the second delay map to generate the first delay map.

7. The laser warning system of claim 2, wherein the delay map comprises a plurality of pixels, and wherein computing the delay map comprises: computing, based upon the image frames and for each of a plurality of pixel locations in the image frames, a time of arrival of a scatter of the beam of light at the image sensor; and assigning a delay value to each of the plurality of pixels of the delay map based upon the computed times of arrival of the scatter at the pixel locations in the image frames.

8. The laser warning system of claim 7, wherein computing the time of arrival of the reflection of the beam at the image sensor for each of the plurality of pixel locations is based upon a temporal model of energy of the beam of the light.

9. The laser warning system of claim 8, wherein the temporal model is a Gaussian pulse model.

10. The laser warning system of claim 8, wherein the temporal model is a top-hat pulse model.

11. The laser warning system of claim 8, wherein the temporal model is representative of a fade or surge in laser intensity induced by an atmosphere through which the beam of the light propagates.

12. The laser warning system of claim 7, wherein the time of arrival of the reflection of the beam of the light is computed at sub-frame precision for each of the pixel locations.

13. The laser warning system of claim 2, wherein computing the direction of propagation of the beam of the light based upon the delay map comprises: computing a path-length variation map that is representative of differences in path length traveled by the beam of the light at each of the locations on the portion of the platform; and based upon the path-length variation map, computing the direction of propagation of the beam of the light.

14. The laser warning system of claim 13, wherein computing the direction of propagation based upon the path-length variation map comprises: fitting a plane to the path-length variation map constrained by a topological model of the platform; and computing, based upon the fitted plane, angles of deflection that are indicative of a direction of propagation of the beam of the light.

15. The laser warning system of claim 1, wherein the imaging sensor generates the image frames at a frame rate of greater than or equal to 108 frames per second.

16. A method of detecting a laser impingement, comprising:
receiving a plurality of image frames from an imaging sensor, the imaging sensor configured to output image frames indicative of light scattered from a platform, each of the image frames representative of a portion of the platform at a different respective time;
detecting an impingement of light upon the platform wherein the light is from a remote laser;
identifying, based upon the image frames, a delay map that indicates, for each of a plurality of locations on the portion of the platform, a time of incidence of a beam of the light at the location;
based upon the delay map, computing a direction of propagation of the beam of the light; and
outputting an indication of the direction of propagation of the beam of the light to a display.

17. The method of detecting a laser impingement of claim 16, wherein computing the direction of propagation of the beam of the light based upon the delay map comprises: generating a path-length variation map that is indicative of different path-lengths traveled by the beam of the light to reach the locations on the portion of the platform; and computing the direction of propagation of the beam of the light based upon the path-length variation map.

18. The method of detecting a laser impingement of claim 17, wherein computing the direction of propagation of the beam of the light based upon the path-length variation map comprises: fitting a plane to the path-length variation map based upon a model of topology of the platform; and based upon slopes of the fitted plane, computing a pair of angles that define the direction of propagation of the beam of the light.

19. A laser warning system comprising:
an imaging sensor mounted on a platform, the imaging sensor configured to output image frames indicative of light received at the imaging sensor;

an optical system that is configured to form an image of a portion of the platform at the imaging sensor; and a hardware logic device that is configured to perform the following acts:

receiving a plurality of image frames from the imaging sensor, each of the image frames representative of the portion of the platform at a different respective time;

detecting an impingement of light upon the platform wherein the light is from a remote laser;

identifying, based upon the image frames, a delay map that indicates, for each of a plurality of locations on the portion of the platform, a time of incidence of a beam of the light at the location; and based upon the delay map, computing a direction of propagation of the beam of the light.

20. The laser warning system of claim 19, wherein the optical system comprises at least one of a mirror or a lens configured to form the image of the portion of the platform at the imaging sensor.

* * * * *